(12) United States Patent (10) Patent No.: US 7,069,783 B2
Uehara (45) Date of Patent: Jul. 4, 2006

(54) ANGULAR VELOCITY SENSOR

(75) Inventor: Hironobu Uehara, Hachioji (JP)

(73) Assignee: Gytronix Inc., Tokyo (JP)

( * ) Notice: Subject to any disclaimer, the term of this patent is extended or adjusted under 35 U.S.C. 154(b) by 0 days.

(21) Appl. No.: 11/006,193

(22) Filed: Dec. 7, 2004

(65) Prior Publication Data

US 2005/0178202 A1 Aug. 18, 2005

(30) Foreign Application Priority Data

Feb. 16, 2004 (JP) ............................. 2004-038736

(51) Int. Cl.
*G01P 15/00* (2006.01)
(52) U.S. Cl. .................. 73/514.12; 73/504.16; 73/497
(58) Field of Classification Search ............ 73/504.12, 73/504.16, 497, 1.37, 1.38, 504.04, 504.02, 73/504.13, 504.14, 504.15
See application file for complete search history.

(56) References Cited

U.S. PATENT DOCUMENTS

| | | | | |
|---|---|---|---|---|
| 5,197,331 A * | 3/1993 | Oikawa | ................... | 73/504.12 |
| 5,412,204 A * | 5/1995 | Nakamura | ............. | 250/231.12 |
| 5,481,914 A * | 1/1996 | Ward | ....................... | 73/504.16 |
| 5,796,002 A * | 8/1998 | Layton | .................. | 73/504.12 |
| 5,806,364 A * | 9/1998 | Kato et al. | ............... | 73/504.12 |
| 6,324,909 B1 * | 12/2001 | Wyse et al. | .............. | 73/504.12 |
| 6,418,790 B1 * | 7/2002 | Yukawa et al. | ......... | 73/504.12 |
| 6,497,146 B1 * | 12/2002 | Hobbs et al. | ............ | 73/504.12 |
| 6,584,841 B1 * | 7/2003 | Ichinose et al. | ......... | 73/504.12 |
| 6,584,842 B1 * | 7/2003 | Fujimoto et al. | ........ | 73/504.12 |
| 6,705,151 B1 * | 3/2004 | Nozoe et al. | ................ | 73/1.37 |

FOREIGN PATENT DOCUMENTS

| | | |
|---|---|---|
| JP | 2781161 | 8/1995 |
| JP | 11-044540 | 2/1999 |
| JP | 2002-174520 | 6/2002 |
| JP | 2003-087057 | 3/2003 |

* cited by examiner

*Primary Examiner*—Helen Kwok
(74) *Attorney, Agent, or Firm*—Merchant & Gould P.C.

(57) ABSTRACT

The angular velocity sensor for detecting an angular velocity for detecting movement amounts and for controlling postures of vehicles, airplanes, cameras, and the like. The angular velocity sensor is provided with a piezoelectric vibrator, a temperature compensation function generating section, a correction coefficient setting section, an oscillation section, a synchronous pulse forming section, and a Coriolis output detection section. If an angular velocity is applied to the piezoelectric vibrator vibrating in a specific direction being driven by the oscillator section, a Coriolis force acts on the piezoelectric vibrator, and a vibration is generated which is perpendicular to the vibration in a specific direction. An electric charge generated by this vibration is detected at the detection electrode of the piezoelectric vibrator. The detected electric charge is converted to a voltage at the Coriolis output detection section, and a temperature compensation is performed, and further, the output is detected and a DC component is extracted. After that, a DC detecting signal having high stability without being influenced by factors such as the ambient temperature, power supply voltage fluctuations and unevenness in circuit devices is output from the Coriolis output detection section.

6 Claims, 4 Drawing Sheets

ANGULAR VELOCITY SENSOR

BACKGROUND OF THE INVENTION

1. Field of the Invention

The present invention relates to a stable angular velocity sensor for detecting amount of movements, controlling postures, and the like, which comprises a piezoelectric vibrator, an oscillator section, and a Coriolis output detection section, that are not influenced by factors such as an ambient temperature, power supply voltage fluctuations, and an unevenness in the components, by utilizing the piezoelectric vibrator such as a crystal vibrator.

2. Related Background Art

Conventional technologies related to angular velocity sensors are disclosed in the following patent publications. Examples include Japanese Patent No. 2781161, Japanese Unexamined Patent Publication Nos. HEI 11-44540, 2002-174520, and 2003-87057.

Figure 1:
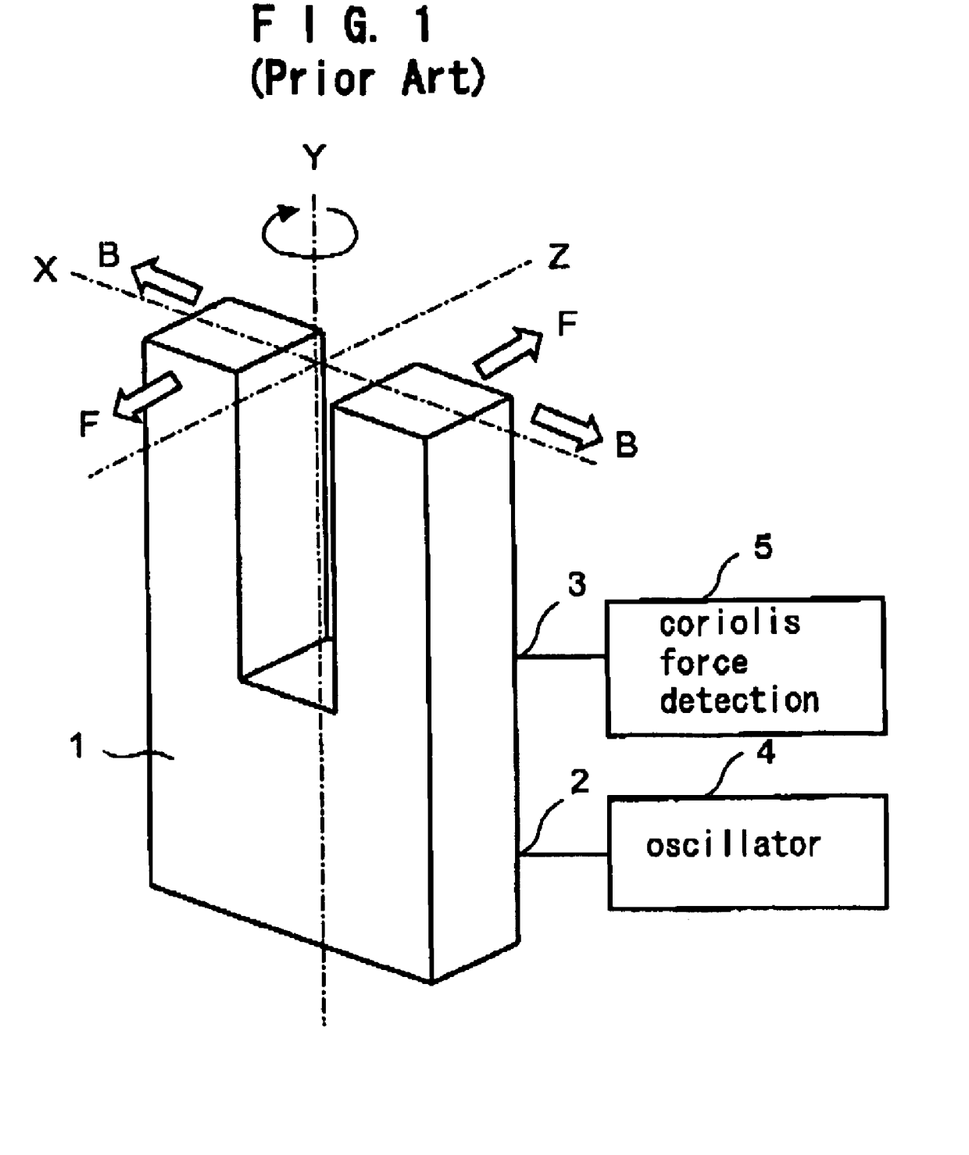
FIG. 1 is a drawing showing a principle of the angular velocity sensor according to the prior art.

FIG. 1 shows a principle of the angular velocity sensor of the prior art disclosed in Japanese Patent No. 2781161.

For example, if a crystal tuning fork vibrator is used as a piezoelectric vibrator 1 of the angular velocity sensor, a drive electrode 2 used in excitation and a detection electrode 3 for detecting Coriolis force are prepared on the pre-determined positions on the front face of the piezoelectric vibrator 1. An oscillator circuit 4 is connected to the drive electrode 2 for supplying an alternating current (hereinafter referred to as AC) drive voltage. Moreover, a Coriolis force detection circuit 5 is connected to the detection electrode 3.

The piezoelectric vibrator 1 having a mass m, vibrates at a pre-determined frequency in the B direction along the X-axis if the AC drive voltage is applied to the drive electrode 2 from the oscillator circuit 4. If an angular velocity $\omega$ is applied around the Y-axis, a Coriolis force F (=2mv $\omega$) is generated in the Z-axis direction perpendicular to the X-axis (provided that v=vibration velocity of the piezoelectric vibrator 1). Since the Coriolis force F is proportional to a magnitude of the angular velocity $\omega$, the magnitude of the angular velocity $\omega$ of the piezoelectric vibrator 1 is determined by detecting the Coriolis force F as a deflection displacement of the piezoelectric vibrator 1 at the Coriolis force detection circuit 5 and the detection electrode 3.

Angular velocity sensors are loaded on vehicles and airplanes to record their run courses and flight locus, and are used in detecting the yaw rates generated at curves. Moreover, recently, the angular velocity sensors are also loaded on robots to control their postures. The car navigation systems which are very common these days also loads them for detecting position displacement where the global positioning system (hereinafter referred to as GPS) waves do not reach. Further, they are also utilized as displacement detecting sensors for preventing the digital camera and video camera shakes.

To improve precision, the following angular velocity sensors are being proposed in Japanese Patent No. 2781161 and Japanese Unexamined Patent Publication No. HEI 11-44540.

According to Japanese Patent No. 2781161, depending on a power supply voltage applied to operate the oscillator circuit 4, a drive voltage level supplied from the oscillator circuit 4 to the drive electrode 2 is controlled by an automatic gain control (hereinafter referred to as AGC) circuit prepared at the oscillator circuit 4. Also, the drive voltage from the oscillator section 4 and a detecting signal from the Coriolis force detection circuit 5 are proportional to the power supply voltage. Because of this, if an analog/digital converter (hereinafter referred to as A/D converter) for converting an analog detecting signal output from the Coriolis force detection circuit 5 to a digital signal, which is connected to an output terminal of the Coriolis force detection circuit 5, a conversion precision of the A/D converter is prevented from changing due to the power supply voltage fluctuations applied to the oscillator circuit 4. The disclosed invention is effective in improving the conversion precision.

According to Japanese Unexamined Patent Publication No. HEI 11-44540, similar to Japanese Patent No. 2781161, an amplitude of the AC drive voltage output from the oscillator circuit 4 is made to change due to the power supply voltage fluctuations applied to the oscillator circuit 4. Moreover, a temperature sensor for detecting the ambient temperature is prepared. To the detecting signal output from the Coriolis force detection circuit 5, a temperature correction process is performed by incorporating an output of the temperature sensor into a microcomputer, by performing the A/D conversion, and further by performing a digital/analog conversion (hereinafter referred to as D/A conversion).

However, the angular velocity sensors of Japanese Patent No. 2781161 and Japanese Unexamined Patent Publication No. HEI 11-44540 do not sufficiently perform a temperature compensation at the oscillator circuits 4; therefore, the inventors of the present application have proposed the following improvements as disclosed in Japanese Unexamined Patent Publication Nos. 2002-174520 and 2003-87057.

In the case of detecting an angular velocity $\omega$ from the Coriolis force F=2mv $\omega$ generated when the angular velocity $\omega$ is applied to the piezoelectric vibrator 1, a detection precision of the angular velocity $\omega$ is improved by making the vibration velocity v of the piezoelectric vibrator 1 constant without a fluctuation caused by the oscillator circuit 4. That is, the vibration velocity v is proportional to an output current from the drive electrode 2 of the piezoelectric vibrator 1, and it is proportional to an output voltage that had converted the output current to the output voltage. Therefore, according to Japanese Unexamined Patent Publication Nos. 2002-174520 and 2003-87057, the oscillator circuit 4 is configured so that the output voltage becomes constant by compensating the temperature, and not influenced by the ambient temperature. The stability of the angular velocity sensors is improved accordingly.

However, the angular velocity sensors disclosed in Japanese Patent No. 2781161, Japanese Unexamined Patent Publication Nos. HEI 11-44540, 2002-174520, and 2003-87057 have the following technical problems.

The angular velocity sensor vibrates the piezoelectric vibrator 1 by applying the AC drive voltage output to the drive electrode 2 from the oscillator circuit 4, and detects the detecting signal of a potential corresponding to the Coriolis force F, by the detection electrode 3 and the Coriolis force detection circuit 5. The angular velocity sensor such as this, the requirement for a stability of the detecting signal is of vital importance, because of the device characteristics (such as the device configuration) of the piezoelectric vibrator itself, and as for the device voltage for vibrating the piezoelectric vibrator 1, because a signal detectable as the Coriolis force F is extremely small. Moreover, the piezoelectric vibrator 1, the oscillator circuit 4, and the Coriolis force detection circuit 5 readily receive temperature influence from the viewpoint of circuit component configuration, therefore, to the utmost, there's the need to increase the quality (that is, the stability) of the oscillator circuit 4 and the Coriolis force detection circuit 5.

However, according to the angular velocity sensors disclosed in Japanese Patent No. 2781161, Japanese Unexamined Patent Publication Nos. HEI 11-44540, 2002-174520, and 2003-87057, the temperature correction process is performed on the detecting signal output from the Coriolis force detection circuit 5, alternatively, the temperature change is controlled by the AGC circuit prepared inside the oscillator circuit 4. For example, in the case of using the piezoelectric vibrator 1 with a large value of temperature coefficient such as the crystal tuning fork vibrator, an operational range of the AGC circuit inside the oscillator circuit 4 is deviated, and an output voltage of the AGC circuit may be excessive or be insufficient. The output voltage for driving the piezoelectric vibrator 1 is not proportional to the temperature. This results in either the saturation or the termination of the oscillation. There's a danger of losing the function as the angular velocity sensor. Moreover, the technical problems such as an insufficient reduction in the startup time, an insufficient measure of the startup failure at power ON, a temperature compensation of the Coriolis force detection circuit 5, and a removal of common-mode component, had not been taken into account.

SUMMARY OF THE INVENTION

The first aim of the present invention is to provide a highly stable and precise angular velocity sensor that is not influenced by the ambient temperature, the power supply voltage fluctuations and the unevenness in circuit components.

The second aim of the present invention is to provide an angular velocity sensor that facilitates the temperature compensation, comprised by a semiconductor integrated circuit, and at a reduced production cost.

The third aim of the present invention is to implement an angular velocity sensor having a stable temperature characteristic even if the piezoelectric vibrator has the large temperature coefficient, and furthermore, to provide a small-sized angular velocity sensor with a relatively simple circuit.

The fourth aim of the present invention is to provide an angular velocity sensor with a fast startup and a low power consumption.

The fifth aim of the present invention is to provide an angular velocity sensor applicable to cost-effective application products, and without attached components, and furthermore, all circuit configuration elements are operable at low voltage.

To achieve the first aim, the first angular velocity sensor of the present invention comprises a piezoelectric vibrator, a temperature compensation function generating section, a correction coefficient setting section, an oscillator section, a synchronous pulse forming section, and a Coriolis output detection section.

The piezoelectric vibrator has first and second drive electrodes and first and second detection electrodes. According to this device, if an AC drive voltage is applied to the second drive electrode, a drive current is output from the first drive electrode due to excitation of a vibration in a specific direction. If an angular velocity is applied from outside, an electric charge that depends on the angular velocity, is detected by the first and second detection electrodes, and the Coriolis output detection currents are output from the first and second detection electrodes. The temperature compensation function generating section generates a temperature compensation function having an opposite temperature coefficient for compensating a detection characteristic and an oscillation characteristic of the piezoelectric vibrator. The correction coefficient setting section sets a correction coefficient for correcting a production unevenness of the device configuration of the angular velocity sensor comprising the piezoelectric vibrator and the circuit elements. The oscillator section converts the drive current to a voltage, performs a temperature compensation, creates a temperature compensated voltage, creates the AC drive voltage from the temperature compensated voltage, and supplies it to the second drive electrode. The synchronous pulse forming section amplifies the temperature compensated voltage based on the correction coefficient, performs a phase adjustment, and creates and outputs a synchronous pulse for a synchronous detection. The Coriolis output detection section performs the synchronous detection of the Coriolis output detection current based on the synchronous pulse, and creates and outputs a direct-current (hereinafter referred to as DC) detecting signal depending on the angular velocity.

Then, the oscillator section is equipped with a first current/voltage converter circuit (hereinafter referred to as I/V converter circuit) for converting the drive current to a voltage, and for outputting a conversion drive voltage; a first temperature compensation circuit for performing a temperature compensation of the conversion drive voltage based on the temperature compensation function, and for creating and outputting the temperature compensated voltage; a startup detection circuit for detecting a startup state of the piezoelectric vibrator, and for outputting a startup detecting signal, based on the AC drive voltage; a gain switching circuit for switching a gain large at the start of oscillation, and for switching a gain so that a loop gain of the oscillator section enters an appropriate range at the steady-state oscillation; a frequency bandwidth-limiting section for limiting a frequency bandwidth of an output voltage of the gain switching circuit, and for amplifying at an amplification degree that depends on the correction coefficient; and an AGC section for calculating an error difference of a predetermined amplitude value and an amplitude value of the AC drive voltage after finishing startup of the piezoelectric vibrator, for controlling a gain of an output voltage of the frequency bandwidth-limiting section so that the error difference is zero, and for maintaining the amplitude value of the AC drive voltage constant.

The Coriolis output detection section comprises a second I/V converter circuit for converting to a voltage the Coriolis output detection current output from the first detection electrode, and for outputting a first detection voltage; a third I/V converter circuit for converting to a voltage the Coriolis output detection current output from the second detection electrode, and for outputting a second detection voltage; a first voltage adjustment circuit for adjusting a phase and an amplitude of a common-mode component of the first detection voltage, based on the correction coefficient; a second voltage adjustment circuit for adjusting a phase and an amplitude of a common-mode component of the second detection voltage, based on the correction coefficient; a differential amplifier circuit for performing a differential amplification of the output voltages of the first and second voltage adjustment circuits, for removing a common-mode component, and for extracting a Coriolis component which is a reversed-mode component; a second temperature compensation circuit for limiting a frequency bandwidth of an output voltage of the differential amplifier circuit, and for performing a temperature compensation based on the temperature compensation function; a detection section for performing a synchronous detection of an output voltage of the second temperature compensation circuit based on the synchronous pulse, for detecting a magnitude and a direction of the Coriolis force, for limiting a frequency bandwidth, for extracting a DC component, and for outputting a DC detection voltage; an adjustment compensation circuit for performing a sensitivity setting of the DC detection voltage based on the correction coefficient, and for performing a temperature compensation of the sensitivity being set based on the temperature compensation function; and an offset adjustment circuit for performing a zero point drift temperature compensation of an output voltage of the adjustment compensation circuit based on the temperature compensation function, and for outputting the DC detecting signal.

Moreover, to achieve the first aim, according to an angular velocity sensor of the second invention, the angular velocity sensor of the first invention, wherein the first temperature compensation circuit is comprised of a first temperature compensation type amplifier circuit. The frequency bandwidth-limiting section is comprised of a low pass filter for removing a high frequency component of the output voltage of the gain switching circuit; an amplifier circuit for amplifying an output voltage of the low pass filter by using the amplification degree that depends on the correction coefficient; and a high pass filter for removing a low frequency component of an output voltage of the amplifier circuit. The AGC section is comprised of a standard power supply circuit for outputting the pre-determined amplitude value as a standard; an amplitude information detection circuit for detecting and outputting an amplitude value of the AC drive voltage after finishing a startup of, the piezoelectric vibrator; a comparator circuit for calculating the error difference by comparing the amplitude value of the AC drive voltage and the pre-determined amplitude value; a feedback circuit for returning the error difference; and an AGC circuit for controlling a gain of an output voltage of the high pass filter based on the error difference of the feedback circuit, and for controlling so that an oscillation loop gain of the oscillator section is 1.

The second temperature compensation circuit is comprised of a high pass filter for removing a low frequency component of the output voltage of the differential amplifier circuit; and a second temperature compensation type amplifier circuit for performing the temperature compensation of an output voltage of the high pass filter based on the temperature compensation function. The detection section is comprised of a synchronous detection circuit for performing the synchronous detection of the output voltage of the second temperature compensation type amplifier circuit, based on the synchronous pulse, and for detecting the magnitude and the direction of the Coriolis force; and a low pass filter for extracting the DC component of an output voltage of the synchronous detection circuit, and for outputting the DC detection voltage. The adjustment compensation circuit is comprised of a full-scale adjustment circuit for performing the sensitivity setting of the DC detection voltage based on the correction coefficient; and a full-scale temperature compensation amplifier circuit for performing the temperature compensation of the sensitivity being set at the full-scale adjustment circuit, based on the temperature compensation function. The offset adjustment circuit is comprised of a DC offset adjustment circuit for performing the zero point drift temperature compensation of the output voltage of the full-scale temperature compensation amplifier circuit based on the temperature compensation function; and an output circuit for outputting the DC detecting signal by performing a buffer/amplify to an output voltage of the DC offset adjustment circuit.

According to the first and second inventions adopting the configuration described above, the drive current from the second drive electrode of the piezoelectric vibrator is converted to the conversion drive voltage by the I/V converter circuit. The temperature compensation is performed to the conversion drive voltage at the first temperature compensation type amplifier circuit having the opposite temperature coefficient. Therefore, the output voltage amplitude characteristic of the temperature becomes approximately even. The temperature compensation over a wide range is securely performed. Because of this, the piezoelectric vibrator with a large temperature coefficient can oscillate stably. An output of the first temperature compensation type amplifier circuit is input, and a startup detecting signal from the startup detection circuit that detects the start of oscillation is input, and the oscillation loop gain is set greater than gain 1 before starting the oscillation, and the gain is reduced if the oscillation startup is detected, and the loop gain of the oscillator section is guided to 1. This way, the oscillation startup time is remarkably shortened. Furthermore, an oscillation amplifier standard value is previously set by the standard power supply circuit, and an amplitude information from the amplitude information detection circuit is compared by the comparator circuit, and the error difference is input to the AGC circuit via the feedback circuit. This way, a stable oscillator section not influenced by temperature fluctuations is provided.

The Coriolis output detection currents from the first and second detection electrodes of the piezoelectric vibrator are converted to the first and second detection voltages by the first and second I/V converter circuits, respectively, and these are input from the first and second voltage adjustment circuits to the differential amplifier circuit. This way, an amplitude and a phase of the unnecessary common-mode signal for canceling can precisely be controlled. Because of this, a DC offset output of the differential amplifier circuit can be eliminated. The temperature compensation is performed to an output of the differential amplifier circuit, via the high pass filter, at the second temperature compensation type amplifier circuit where a temperature dependency characteristic of the output voltage becomes approximately even. The temperature compensation is securely performed even if a Coriolis output has a large temperature coefficient. Therefore, a Coriolis output without the temperature dependency is provided. An output from the second temperature compensation type amplifier circuit is detected by the synchronous detection circuit operated by the synchronous pulse from the synchronous pulse forming section, via the low pass filter for removing the DC component, a sensitivity adjustment is performed by the full-scale adjustment circuit, and furthermore, the temperature compensation for the sensitivity is performed by the full-scale temperature compensation amplifier circuit. An output of the full-scale temperature compensation amplifier circuit performs the zero point drift temperature compensation by the DC offset adjustment circuit, and output the DC detecting signal from the output circuit; and the Coriolis output detection section not influenced by temperature fluctuations is provided. Because of this, an angular velocity sensor not receiving influences such as the temperature and power supply fluctuations and the unevenness in the circuit components, is provided. Moreover, a phase adjustment function is prepared at the synchronous pulse forming section; therefore, the Coriolis output detection section is configured so that the synchronous detection timing is precisely adjusted, and a highly sensitive DC detecting signal without detection loss is provided.

Furthermore, as for the temperature compensation function generating section, the temperature compensation function having the opposite temperature coefficient is generated and the non-temperature compensation characteristic is compensated. The temperature compensation characteristic with good precision is provided accordingly. Moreover, as for the correction coefficient setting section, a correction coefficient is set for correcting the production unevenness of the piezoelectric vibrators and circuit devices; therefore, an angular velocity sensor with a good yield is produced, and the devices can be configured that coincides with the production process of all the semiconductor integrated circuits which is extremely cost-effective.

To achieve the second aim, according to an angular velocity sensor of third invention, the angular velocity sensor of the second invention, wherein each of the temperature compensation type amplifier circuits comprise an operational amplifier (hereinafter referred to as Op amp); a metal oxide semiconductor type transistor (hereinafter referred to as MOS-type transistor) which is gate controlled by the temperature compensation function, and which is connected to one side of a feedback resistance of the Op amp; and a resistance having a temperature coefficient of an opposite polarity from a temperature coefficient the ON-resistance of the MOS-type transistor (that is, resistance value at the state of ON).

According to the third invention adopting the previously described configuration, the temperature coefficient of the ON-resistance of the MOS-type transistor and the opposite temperature coefficient are cancelled, and the temperature compensation type amplifier circuit can be without the temperature coefficient. Even if the MOS-type transistor used as the variable resistance has a temperature coefficient, the temperature compensation is performed accordingly to the temperature compensation function output from the temperature compensation function generating section. These devices that agree with the production process of all semiconductor integrated circuits are very cost-effective.

To achieve the third aim, according to an angular velocity sensor of the fourth invention, the angular velocity sensor of the second invention, wherein the temperature compensation type amplifier circuit serially connects Nth inverting amplifier circuits (provided that N is a positive integer of 2 or more) comprised of the Op amps, and one side of the feedback resistance of each of the op amp is comprised of a resistive element of 1/N temperature coefficient of the temperature coefficient of the piezoelectric vibrator.

According to the forth invention adopting the previously described configuration, the resistive element having 1/N temperature coefficient of the piezoelectric vibrator is used as a temperature compensation resistance, therefore, even if a piezoelectric vibrator has a very large temperature coefficient, each of the inverting amplifier circuits need only to perform 1/N temperature compensation. For example, in the case of poly-silicon resistance widely used as the resistive element in the integrated circuits, a sheet resistivity is appropriately selected suitable for production. This way, the production process unevenness is minor, and a precise integrated circuit is provided. That is, by increasing the Nth connection, even if the piezoelectric vibrator has an extremely large temperature coefficient, the angular velocity sensor having a stable temperature characteristic is implemented. Furthermore, the resistive element does not require an outside control being an autonomous control method so that a control signal from the temperature compensation function generating circuit is unnecessary, and the circuit is simplified, and an integrated circuit with small chip area is provided.

To achieve the fourth aim, according to an angular velocity sensor of the fifth invention, the angular velocity sensor of the second invention, wherein the gain switching circuit has an Op amp, a resistance for deciding a gain of the Op amp, and a switch element connected to the resistance for performing an ON and OFF operation by the startup detecting signal. At startup of the oscillator section, the switch element is ON by the startup detecting signal, and a gain is set greater than 1 and no more than 3, and when the piezoelectric vibrator starts to oscillate, the switch element is OFF by the startup detecting signal, and a gain is set to 1.

According to the fifth invention adopting the previously described configuration, the gain of the gain switching circuit is set as greater than 1 at startup; and this is effective in reducing the startup time. The gain of no more than 3 is set at the gain switching circuit at switching to the steady-state oscillation, which is the maximum possible gain setting of the gain switching circuit. This way, just before and after switching to the steady-state oscillation, for example, when gain bandwidth product of Op amp is 1 MHz, and the oscillation frequency is ranging from 10 kHz to 30 kHz, a phase rotation amount is no more than 5 degrees, which is much smaller in comparison to the case of gain=1. A stable oscillator section having a short startup time, without startup failure is provided. Furthermore, a low power Op amp with a small gain bandwidth product of Op amp of about 1 kHz (that is, the circuit bias current is small), so that the angular velocity sensor of a low power consumption is implemented.

To achieve the fifth aim, according to an angular velocity sensor of the sixth invention, the angular velocity sensor of the second invention, wherein the startup detection circuit comprises a rectifier circuit including a P-channel MOS-type transistor (hereinafter referred to as PMOS) connecting a gate electrode and a drain electrode, a low pass filter including an active filter, an amplifier circuit, and a wave-forming circuit, which are serially connected.

According to the sixth invention adopting the previously described configuration, for example, if the startup detection circuit is formed by the semiconductor integrated circuit, then a PN-junction diode in a rectifier circuit or a large capacity capacitor of the low pass filter are not required, and absolutely without the attached components, and what is more all elements are operable at the low voltages, for example, an integrated circuit operable at power supply of 3 Volts is provided. That is, a diode having a pure PN-junction used as rectifier in the intermediate potential inside the circuit cannot be comprised in a complementary metal oxide semiconductor (hereinafter referred to as CMOS) so that the diode becomes attached component and not cost-effective. By installing the component inside the chip, a cost-effective application product is supplied.

The present invention will become more fully understood from the detailed description given hereinbelow and the accompanying drawings which are given by way of illustration only, and thus do not limit the present invention.

DESCRIPTION OF THE PREFERRED EMBODIMENTS

Hereunder, the preferred embodiments of the present invention will be described with reference to the attached drawings.

Figure 2:
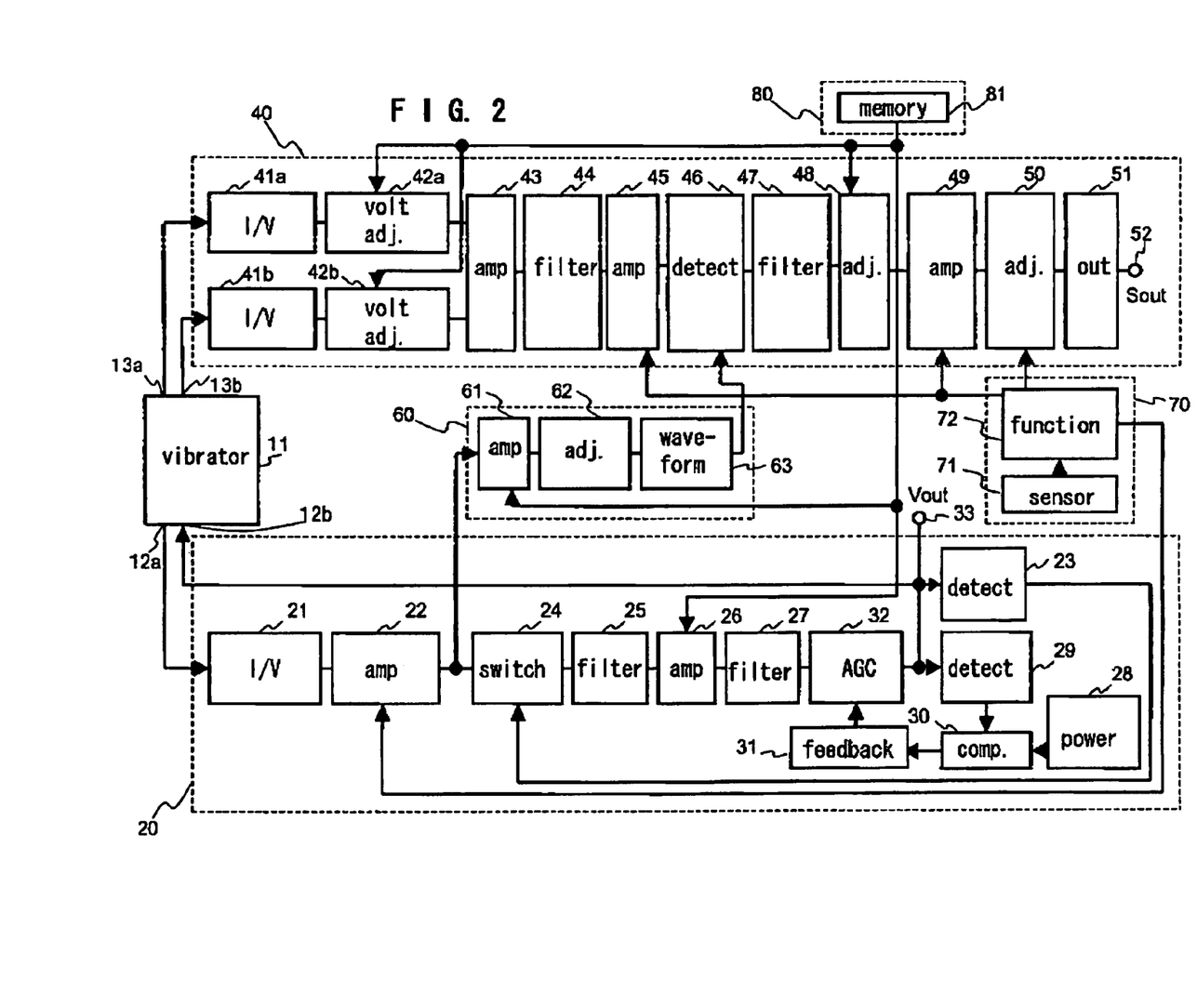
FIG. 2 is a drawing showing a configuration of the angular velocity sensor according to the preferred embodiment 1 of the present invention.

First Embodiment (FIG. 2)

The angular velocity sensor of FIG. 2, for example, is based on the same principle as the angular velocity sensor of FIG. 1, having the piezoelectric vibrator 11 such as crystal tuning fork vibrator. On the pre-determined positions of the piezoelectric vibrator 11, a first drive electrode 12a and a second drive electrode 12b for driving the piezoelectric vibrator 11, and a first detection electrode 13a and a second detection electrode 13b for detecting an electric charge depending on (for example, proportional to) an angular velocity ω applied to the piezoelectric vibrator 11, are prepared. An oscillator section 20 is connected to the drive electrodes 12a and 12b for supplying an AC drive voltage to the drive electrode 12b, which excites vibration of the piezoelectric vibrator 11 in a specific direction. An Coriolis output detection section 40 is connected to the detection electrode 13a and 13b, for outputting a DC detecting signal S out proportional to an angular velocity ω applied to the piezoelectric vibrator 11. A synchronous pulse forming section 60 and a temperature compensation function generating section 70 are connected to the oscillator section 20 and the Coriolis output detection section 40. Furthermore, a correction coefficient setting section 80 for correcting the piezoelectric vibrator/amplifier circuit is connected to the Coriolis output detection section 40.

In the oscillator section 20, a first I/V converter circuit 21 connected to the drive electrode 12a and a temperature compensation type amplifier circuit 22 which is a first temperature compensation circuit, and a startup detection circuit 23 for detecting the startup state of the piezoelectric vibrator 11 connected to the drive electrode 12b of the piezoelectric vibrator 11 are prepared. The I/V converter 21 is a circuit for converting a drive current output from the drive electrode 12a to a conversion drive voltage, and on its output side the temperature compensation type amplifier circuit 22 is connected. The temperature compensation type amplifier circuit 22 is a circuit for performing a temperature compensation of the conversion drive voltage from the I/V converter circuit 21, based on a temperature compensation function output from the temperature compensation function generating section 70. On its output side, the gain switching circuit 24 is connected. The gain switching circuit 24 is a circuit for setting a loop gain of the oscillator section 20 to enter an appropriate range at the steady-state oscillation, and for setting a large gain to a temperature compensated voltage output from the temperature compensation type amplifier circuit 22 at the start of oscillation, based on a startup detecting signal output from the startup detection circuit 23. A frequency bandwidth-limiting section (for example, a low pass filter 25, an amplifier circuit 26, and a high pass filter 27) is connected to an output side of the gain switching circuit 24.

The oscillator section 20 further prepares a standard power supply circuit 28 for providing a pre-determined amplitude value which is a standard value of the oscillation amplitude, and an amplitude information detection circuit 29. The amplitude information detection circuit 29 is a circuit for detecting an amplitude information (that is, an amplitude value of the AC drive voltage) of the piezoelectric vibrator 11 connected to the drive electrode 12b of the piezoelectric vibrator 11. To their output sides a comparator circuit 30 is connected. The comparator circuit 30 is a circuit for calculating an error difference between a pre-determined amplitude value from the standard power supply circuit 28 and an amplitude value of the AC drive voltage from the amplitude information detection circuit 29. On its output side an AGC circuit 32 is connected via a feedback circuit 31. The AGC circuit 32 is connected to an output side of the high pass filter 27, which is a circuit for keeping an oscillation loop gain as 1, based on the error difference from the feedback circuit 31. An AC drive voltage Vout output from the AGC circuit 32 is supplied to the drive electrode 12b, the amplitude information detection circuit 29, the startup detecting circuit 23, and an output terminal 33. An AGC section is comprised of the standard power supply circuit 28, the amplitude information detection circuit 29, the comparator circuit 30, the feedback circuit 31, and the AGC circuit 32.

A Coriolis output detection section 40 has a second and third I/V converter circuits 41a and 41b for converting the Coriolis output detection currents from the first and second detection electrodes 13a and 13b to the first and second detection voltages, respectively. On their output side, two conversion output voltage adjustment circuits 42a and 42b are respectively connected, and these are the first and second voltage adjustment circuits. Each of the conversion output voltage adjustment circuits 42a and 42b is a circuit to prepare for canceling the common-mode signals such as cross talk (specifically, an amplitude and a phase of common-mode signal are coincided), based on a correction coefficient provided from the correction coefficient setting section 80. On its output side, a differential amplifier circuit 43 is connected. The differential amplifier circuit 43 amplifies the difference of two output voltages of the two conversion output voltage adjustment circuits 42a and 42b, and has a function to cancel the common-mode signals such as cross talk caused by the drive voltage of the oscillator section 20. On its output side, a second temperature compensation circuit (for example, a high pass filter 44 and a temperature compensation type amplifier circuit 45) is connected. The temperature compensation type amplifier circuit 45 is a circuit for compensating the output temperature characteristics of the piezoelectric vibrator 11, based on the temperature compensation function provided from the temperature compensation function generating section 70. On its output side, a detection section (for example, a synchronous detection circuit 46 and a low pass filter 47) is connected.

The synchronous detection circuit 46 is a circuit for performing a synchronous detection of the Coriolis output voltage output from the differential amplifier circuit 43, based on a synchronous pulse provided from the synchronous pulse forming section 60. On its output side, the low pass filter 47 is connected for removing a DC signal. On the output side of the low pass filter 47, the adjustment compensation circuit (for example, a full-scale adjustment circuit 48 and a full-scale temperature compensation amplifier circuit 49) is connected. The full-scale adjustment circuit 48 is a circuit for setting a DC output sensitivity based on a correction coefficient provided from the compensation coefficient setting section 80. On its output side, a full-scale temperature compensation amplifier circuit 49 is connected. The full-scale temperature compensation amplifier circuit 49 is a circuit for adjusting the sensitivity due to temperature change of the Coriolis output voltage, based on a temperature compensation function provided from a function generating section 70. On its output side, an offset adjustment circuit (for example, the DC offset adjustment circuit 50 and an output circuit 51) is connected. A DC offset adjustment circuit 50 is a circuit for compensating a zero point drift, based on the temperature compensation function provided from the function generating section 70. On its output side, the output circuit 51 is connected. The output circuit 51 is a circuit for outputting a DC detecting signal S out to an output terminal 52, and for performing buffer/amplify to an output voltage of the DC offset adjustment circuit 50.

The synchronous pulse forming section 60 connected to the oscillator section 20 and the Coriolis output detection section 40 are comprised of an amplifier circuit 61, a phase adjustment circuit 62, and a wave-forming circuit 63. The amplifier circuit 61 is connected to an output side of the temperature compensation type amplifier circuit 22; and it is a circuit for amplifying temperature compensated voltage from the temperature compensation type amplifier circuit 22, using an amplification degree which is based on a correction coefficient provided from the correction coefficient setting section 80. On its output side, the phase adjustment circuit 62 is connected. The phase adjustment circuit 62 is a circuit for adjusting a detection timing to a perform synchronous detection of an output voltage of the amplifier circuit 61. On its output side, the wave-forming circuit 63 is connected. The wave-forming circuit 63 creates a synchronous pulse by converting an output voltage of the phase adjustment circuit 62 to a pulse shape; and it is a circuit for providing the synchronous pulse to the synchronous detection circuit 46.

The temperature compensation function generating section 70 connected to the oscillator section 20 and the Coriolis output detection section 40 is comprised of a temperature sensor 71 for detecting the ambient temperature of the piezoelectric vibrator 11 and a temperature compensation function circuit 72 connected to its output side. The temperature compensation function circuit 72 is a circuit for generating a temperature compensation function having the opposite temperature coefficient for compensating the oscillation characteristic and detection characteristic of the piezoelectric vibrator 11, based on an output voltage of the temperature sensor 71. Its output side is connected to the temperature compensation type amplifier circuit 22 inside the oscillator section 20, the temperature compensation type amplifier circuit 45 inside the Coriolis output detection section 40, the full-scale temperature compensation amplifier circuit 49 and the DC offset adjustment circuit 50.

The correction coefficient setting section 80 connected to the oscillator section 20 and the Coriolis output detection section 40 performs correction for fixed deviation and unevenness occurring in the piezoelectric vibrator 11, the oscillator 20 comprising the electric circuit, the Coriolis output detection section 40 and the synchronous pulse forming section 60 upon production. It is comprised of a memory element 81, for example. An output side of the memory element 81 is connected to the amplifier circuit 26 inside the oscillator section 20, the converter output voltage adjustment circuits 42a and 42b inside the Coriolis output detection section 40, the full-scale adjustment circuit 48, and the amplifier circuit 61 inside the synchronous pulse forming section 60.

Next, as for the angular velocity sensor of FIG. 2, (a) an operation of the oscillator section 20; (b) an operation of the Coriolis output detection section 40; (c) an operation of the synchronous pulse forming section 60; (d) an operation of the temperature compensation function generating section 70; and (e) an operation of the correction coefficient setting section 80, shall be described.

(a) Operation of Oscillator Section 20

To start the vibration of the piezoelectric vibrator 11 by applying a power supply voltage without the output from the startup detection circuit 23, the gain of the gain switching circuit 24 for performing a switch setting of an oscillation loop gain gets large, and the oscillation loop gain gets larger than 1. The AC drive voltage Vout, from the AGC circuit 32 where the oscillation loop gain is greater than 1, is supplied to the drive electrode 12b; and the piezoelectric vibrator 11 starts to vibrate.

If the piezoelectric vibrator 11 starts to vibrate, a drive current output from the drive electrode 12a is converted to a conversion drive voltage at the I/V converter circuit 21. The conversion drive voltage of the I/V converter circuit 21 is amplified at the gain switching circuit 24 still at the state of large gain, the high frequency component is removed at the low pass filter 25, and is amplified at the amplifier circuit 26 having a pre-determined amplification degree, the low frequency component is removed at the high pass filter 27, and is provided to the drive electrode 12b via the AGC circuit 32. Because of this, the vibration of the piezoelectric vibrator 11 in a specific direction is promoted, and this vibrator 11 starts quickly.

If the piezoelectric vibrator 11 startup finishes, the AC drive voltage Vout output from the AGC circuit 32 is input to the startup detection circuit 23, therefore, a startup detecting signal output from the startup detection circuit 23 switches a gain, that is the gain of the gain switching circuit 24, to a reduced direction, and the oscillation loop gain is set to 1. Because of this, the piezoelectric vibrator 11 continues to vibrate in a specific direction at the constant amplitude by an AC drive voltage Vout from the AGC circuit 32. According to the AC drive voltage Vout at this time, the pre-determined amplitude value is previously determined by the standard power supply circuit 28 is previously determined, the amplitude value from the amplitude information detection circuit 29 is compared by the comparator circuit 30, the error difference is feedback to the AGC circuit 32 via the feedback circuit 31, and the amplitude is maintained constant.

(b) Operation of Coriolis Output Detection Section 40

If an angular velocity ω is applied to the piezoelectric vibrator 11 vibrating at a constant frequency in a specific direction, a Coriolis force F acts on the piezoelectric vibrator 11, and a vibration in a direction perpendicular to the specific direction of the piezoelectric vibrator 11 is generated, and the electric charge generated on the piezoelectric vibrator 11 by this vibration is detected by the detection electrodes 13a and 13b, and the Coriolis output detection currents are output from the detection electrodes 13a and 13b. These detection currents are converted to detection voltages at the I/V converter circuits 41a and 41b, respectively. The phase and amplitude of common-mode components of these detection voltages are adjusted by the conversion output voltage adjustment circuits 42a and 42b, respectively. The common-mode components are cancelled by the differential amplifier circuit 43, and just the Coriolis component which is a reversed-mode component only is extracted, and this is transmitted to the high pass filter 44.

In the high pass filter 44, the low frequency components are removed, and the temperature compensation of reversed-mode component (that is, Coriolis component) is performed at the temperature compensation type amplifier circuit 45, and it is transmitted to the synchronous detection circuit 46. The synchronous detection circuit 46 performs the synchronous detection for extracting the magnitude and direction of the Coriolis force by a synchronous pulse from the wave-forming circuit 63 inside the synchronous pulse forming unit 60, and after removing the high frequency component and extracting the DC component by the low pass filter 47, the sensitivity setting of the angular velocity sensor is performed, and further, the sensitivity of temperature compensation is performed by the full-scale adjustment circuit 48, and the sensitivity change due to temperature is compensated by the full-scale temperature compensation amplifier circuit 49. Temperature compensation of zero point drift is performed on an output voltage of the full-scale temperature compensation amplifier circuit 49, by the DC offset adjustment circuit 50. A DC detecting signal S out proportional to the angular velocity ω is output to an output terminal 52 from the output circuit 51.

(c) Operation of Synchronous Pulse Forming Section 60

The synchronous pulse forming section 60 is a circuit for performing a synchronous detection by controlling the synchronous detection circuit 46 by standardizing a temperature compensated voltage from the temperature compensation type amplifier circuit 22 inside the oscillator 20, and generates a timing pulse of the detection (that is, a synchronous pulse). The temperature compensated voltage output from the temperature compensation type amplifier circuit 22 inside the oscillator section 20 is amplified at the amplifier circuit 61, and after adjusting the phase by the phase adjustment circuit 62 that sets the detection timing, it is wave-formed at the wave-forming circuit 63 and a timing pulse (that is, the common-mode pulse) is formed, and it is sent to the synchronous detection circuit 46 inside the Coriolis output detection section 40; and the synchronous detection is performed.

(d) Operation of Temperature Compensation Function Generating Section 70

The temperature compensation function generating section 70 is a circuit for generating a temperature compensation function having a temperature coefficient opposite from the temperature coefficient of a piezoelectric vibrator 11, the circuits inside the Coriolis output detection circuit 40 and the oscillator section 20 connected to the piezoelectric vibrator 11. Based on the temperature information from the temperature sensor 71, n-dimension function having the opposite temperature coefficient for canceling the temperature coefficients is generated by the temperature compensation function circuit 72 (provided that n=positive integer). This n-dimension function is sent to the temperature compensation type amplifier circuit 22 inside the oscillator section 20, the temperature compensation type amplifier circuit 45 inside the Coriolis output detection section 40, the full-scale temperature compensation type amplifier circuit 49, and the DC offset adjusting current 50; and the predetermined temperature compensation is performed accordingly.

(e) Operation of Correction Coefficient Setting Section 80

The correction coefficient setting section 80 is a circuit for setting a correction coefficient of an amplification degree for correcting an initial unevenness caused by the production of the piezoelecric vibrator 11, the circuits inside the oscillator section 20 and the circuits inside the Coriolis output detection section 40. The correction coefficient setting section 80 is comprised of the memory element 81 which can be written-in from outside, and the correction coefficient read out from it is sent to the amplifier circuit 26 inside the oscillator section 20, the conversion output voltage adjustment circuits 42a and 42b, the full-scale adjustment circuit 48 inside the Coriolis output detection section 40, and the amplifier circuit 61 inside the synchronous pulse forming section 60; and the initial unevenness is corrected accordingly.

The embodiment 1 has the following effects (1) to (9).

(1) The drive voltage from the drive electrode 12a of the piezoelectric vibrator 11 is converted to the conversion drive voltage by the I/V converter circuit 21, and the temperature compensation is performed to the conversion drive voltage at the temperature compensation type amplifier circuit 22 having the opposite temperature coefficient, where the output voltage amplitude characteristic of the temperature gets approximately even, and the temperature compensation over a wide range is securely performed, and the piezoelectric vibrator 11 having a large temperature coefficient oscillates stably.

(2) The temperature compensated voltage output from the temperature compensation type amplifier circuit 22 is input to the gain switching circuit 24, the startup detecting signal from the startup detection circuit 23 for detecting a start of oscillation is input to the gain switching circuit 24, the gain in the oscillation loop gain is set larger than 1 before starting the oscillation, the gain is reduced when the oscillation startup is detected, and the loop gain of the oscillator section 20 can be guided to 1; therefore, the oscillation starting time can remarkably be shortened.

(3) By the standard power supply circuit 28, a predetermined amplitude value is set beforehand which is an oscillation amplitude standard value, an amplitude information from the amplitude information detection circuit 29 (that is, the amplitude value of the AC drive voltage) is compared by the comparator circuit 30, and the error difference is input to the AGC circuit 32 via the feedback circuit 31; therefore, the stable oscillator section 20 that is not influenced by the temperature fluctuation is provided.

(4) The Coriolis output detection currents from the detection electrodes 13a and 13b of the piezoelectric vibrator 11, are converted to the detection voltages by each of the I/V converter circuits 41a and 41b, and the detection voltages are input to the differential amplifier circuit 43 from the detection output voltage adjustment circuits 42a and 42b; therefore, the amplitudes and phases of the unnecessary common-mode signals that should be cancelled are precisely controlled, and the DC offset output of the differential amplifier circuit 43 can be eliminated.

(5) An output voltage of the differential amplifier circuit 43, via the high pass filter 44, performs the temperature compensation of the output voltage by the temperature compensation type amplifier circuit 45 where a temperature dependency characteristic of the output voltage becomes approximately even. Therefore, even if a Coriolis output has a large temperature coefficient, the temperature compensation is securely performed to provide the Coriolis output without temperature dependency.

(6) The output voltage from the temperature compensation type amplifier circuit 45 is detected by the synchronous detection circuit 46 that operates by the synchronous pulse from the synchronous pulse forming section 60, the sensitivity setting is performed by the full-scale adjustment circuit 48 via the low pass filter 47 which removes the DC component, and the temperature compensation sensitivity is performed by the full-scale temperature compensation amplifier circuit 49. Furthermore, the zero point drift temperature compensation is performed to an output of the full-scale temperature compensation amplifier circuit 49 by the DC offset adjustment circuit 50, and a DC detecting signal Sout is output to an output terminal 52 via an output circuit 51. This way, a Coriolis output not influenced by temperature fluctuation is detected; therefore, an angular velocity sensor is not influenced by the temperature fluctuations, power supply voltage fluctuation and unevenness in circuit components.

(7) The phase adjustment circuit 62 is prepared at the synchronous pulse forming section 60; therefore, the synchronous detection timing is precisely adjusted, and able to comprise the Coriolis output detection section 40 which can provide the DC detecting signal S out having the best sensitivity without detection loss.

(8) As for the temperature compensation function generating section 70, the temperature compensation function having the opposite temperature coefficient is generated and the non-temperature compensation characteristic is compensated; therefore, a highly precise temperature compensation characteristics.

(9) As for the correction coefficient setting section 80, the correction coefficient can be written from outside for correcting unevenness in the production of the circuit devices and a piezoelectric vibrator 11; therefore, an angular velocity sensor having a good yield is produced. Moreover, it can be comprised as devices that coincide to the production process of all semiconductor integrated circuits, which is extremely cost-effective.

Figure 3:
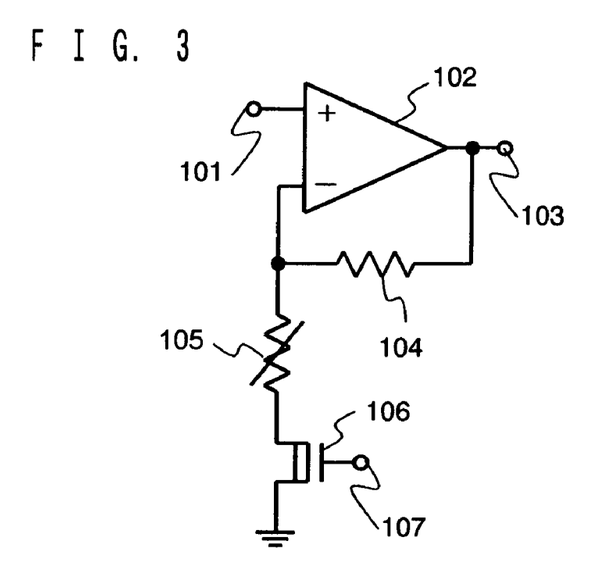
FIG. 3 is a drawing showing a configuration of the temperature compensation type amplifier circuit of FIG. 2 according to the preferred embodiment 2 of the present invention.

Second Embodiment (FIG. 3)

The temperature compensation type amplifier circuit of FIG. 3 is a circuit corresponding to the temperature compensation type amplifier circuit 22 inside the oscillator section 20 and the temperature compensation type amplifier circuit 45 inside the Coriolis output detection section 40 of FIG. 2.

The temperature compensation type amplifier circuit has an input terminal 101 connected to the output sides of the I/V converter circuit 21 or the high pass filter 44 of FIG. 2. An non-inverting input terminal of an Op amp 102 is connected to the input terminal 101. An output side of the Op amp 102 which is an output terminal 103 is connected to an input side of the gain switching circuit 24 or the synchronous detection circuit 46 of FIG. 2. In between an inverting input terminal of the Op amp 102 and the output side of output terminal 103, one of a feed back resistance 104 is connected. In between the inverting input terminal of the Op amp 102 and a ground, the other feedback resistance 105 and a depression MOS-type transistor 104 (hereinafter referred to as DMOS) are serially connected. The resistance 105 has a temperature coefficient opposite from a temperature coefficient of the ON-resistance of a DMOS 106 used as a variable resistance. A gate electrode side of a control signal input terminal 107 of the DMOS 106 is connected to an input side of the temperature compensation function generating section 70 of FIG. 2.

An operation of the temperature compensation function generating section of FIG. 3 shall be described next.

For example, a function output from the temperature compensation function generating section 70 of FIG. 2 is input to the control signal input terminal 107 inside the temperature compensation type amplifier circuit of FIG. 3. Then, depending on an amplification degree of the function, the input voltage of the input terminal 101 is amplified at the Op amp 102, and it is output to the output terminal 103.

The embodiment 2 has the following effects.

Since a temperature coefficient of the ON-resistance of the DMOS 106 and its opposite temperature coefficient of the resistance 105 are cancelled, the temperature compensation type amplifier circuit of FIG. 3 itself can be without the temperature coefficient. Because of this, even if the ON-resistance of the DMOS 106 used as a variable resistance has a temperature coefficient, the temperature compensation type amplifier circuit can be implemented to perform the temperature compensation by using the temperature compensation function provided from the temperature coefficient function generating section 70 of FIG. 2. Moreover, it can be comprised as devices that coincides to the production process of all semiconductor integrated circuits which is extremely cost-effective.

Figure 4:
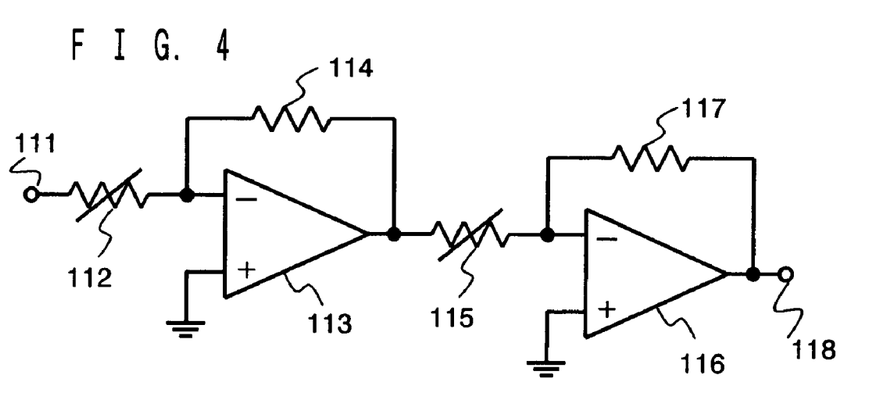
FIG. 4 is a drawing showing a configuration of the temperature compensation type amplifier circuit of FIG. 2 according to the preferred embodiment 3 of the present invention.

Third Embodiment (FIG.4)

A temperature compensation type amplifier circuit shown in FIG.4 corresponds to a circuit of the temperature compensation type amplifier circuit 22 inside the oscillator section 20 or the temperature compensation type amplifier circuit 45 inside the Coriolis output detection section 40 of FIG. 2.

This temperature compensation type amplifier circuit comprised of Nth inverting amplifier circuits with the identical circuit configuration using Op amps (provided that N is a positive integer no less than 2, for example N=2), and they are serially connected. The first inverting amplifier circuit has an input terminal 111 connected to an output side of the high pass filter 44 or the I/V converter circuit 21 of FIG. 2. On the input terminal 111, an inverting input terminal of the Op amp 113 is connected via one of the feedback resistance 112. In between the inverting input terminal and the output terminal of the Op amp 113, the other feedback resistance 114 is connected. Furthermore, the non-inverting input terminal of the Op amp 113 is connected to the ground. The feedback resistance 112 is comprised of a resistive element having 1/N temperature coefficient (for example, 1/2) of the temperature coefficient of the piezoelectric vibrator 11.

A second inverting amplifier circuit is connected to the output terminal of the Op amp 113. The second inverting amplifier circuit, similar to the first inverting amplifier circuit, is comprised of one of the feedback resistance 115, an Op amp 116, and the other feedback resistance 117. On the output side of the Op amp 116 which is an output terminal 118 is connected to the gain switching circuit 24 or an input side of the synchronous detection circuit 46 of FIG. 2.

Operation of the temperature compensation type amplifier circuit of FIG.4 shall be described next.

According to the temperature compensation type amplifier circuit of FIG.4, an input voltage of the input terminal 111 is inversely amplified at the Op amp 113, and this is further inversely amplified at the Op amp 116, and it is output from the output terminal 118.

Embodiment 3 has the following effects (1) and (2).

(1) The temperature compensation resistances 112 and 115 are comprised of the resistive element having 1/N temperature coefficient (for example, N=2) of the temperature compensation of the piezoelectric vibrator 11. Even for the piezoelectric vibrator 11 with a very large temperature coefficient, each of the inverting amplifier circuit need only to perform 1/N temperature coefficient. Because of this, for example, in the case of poly-silicon resistance which is widely utilized as a resistive element in the integrated circuits, since the sheet resistivity can be freely selected in the appropriate production ranges; therefore, an integrated circuit, having a good precision where the unevenness in production process is minor, is provided. That is, by increasing an Nth connection of the inverting amplifier circuits, even if the piezoelectric vibrator 11 has an extremely large temperature coefficient, the angular velocity sensor having a stable temperature characteristics is implemented.

(2) The external controls of the resistances 112 and 115 are unnecessary because the autonomous control method is being adopted, the control from the temperature compensation function generating section 70 of FIG. 2 is unnecessary, and an integrated circuit with a simple circuit and a small chip area is provided.

Figure 5:
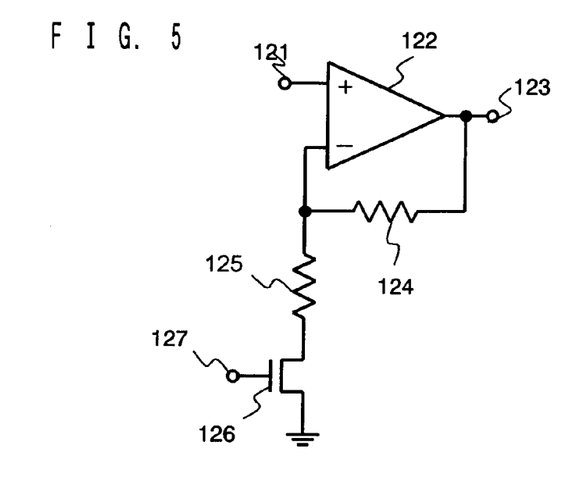
FIG. 5 is a drawing showing a configuration of the gain switching circuit of FIG. 2 according to the preferred embodiment 4 of the present invention.

Fourth Embodiment (FIG. 5)

A gain switching circuit shown in FIG. 5 is a circuit corresponding to the gain switching circuit 24 of FIG. 2.

The gain switching circuit has an input terminal 121 connected to an output side of the temperature compensation type amplifier circuit 22 of FIG. 2. Non-inverting input terminal of the Op amp 122 is connected to the input terminal 121. An output terminal 123 of an output side of the Op amp 122, connected to an input side of the low pass filter 25 of FIG. 2. In between the inverting input terminal of the Op amp 122 and the output terminal 123, one of the feedback resistance 124 is connected. In between the ground and the inverting input terminal of the Op amp 122 is the other feedback resistance 125 and a transistor switch (that is, a switch device formed by the transistor) 126 are serially connected. A control signal input terminal 127 of the gate electrode side of the transistor switch 126 is connected to an output side of the startup detection circuit 23 of FIG. 2.

When the transistor switch 126 is ON, a resistance ratio of the feedback resistances 124 and 125 is previously being set so that the gain of the gain switching circuit is greater than 1, and not more than 3.

An operation of the gain switching circuit of FIG. 5 shall be described next.

According to the oscillator section 20 of FIG. 2, on startup, there's no output from the start up detection circuit 23. An output (that is, a startup detecting signal of the negative logic) is input to a gate electrode of the transistor switch 126, and the transistor switch 126 is ON, so that the gain of this gain switching circuit is set greater than 1 and not more than 3. Then, the piezoelectric vibrator 11 starts to oscillate because the oscillation loop gain of the oscillator section 20 of FIG. 2 gets greater than 1. When the oscillation starts, an AC drive voltage Vout is input to the startup detection circuit 23, and the output of the detection result of the startup detection circuit 23 (that is, the startup detecting signal of the negative logic) is input to the gate electrode of the transistor switch 26 inside the gain switching circuit, and the transistor switch 126 is OFF. When the transistor switch 126 is OFF, the feedback resistance 125 connected to it is cut-off from the ground, and the gain switching circuit comprised of the Op amp 122 becomes a voltage follower, and the gain is 1. Moreover, the AGC circuit 32 operates so that the oscillation loop gain is 1, and the oscillation shifts to the steady-state oscillation.

Embodiment 4 has the following effects (1) and (2).

(1) According to the gain switching circuit of Embodiment 4, the gain of the gain switching circuit is set as greater than 1 at startup; and this is effective in reducing the startup time. The gain of no more than 3 is set at the gain switching circuit at switching to the steady-state oscillation, which is the maximum possible gain setting of the gain switching circuit. This way, just before and after switching to the steady-state oscillation, for example, when gain bandwidth product of Op amp is 1 MHz, and the oscillation frequency is ranging from 10 kHz to 30 kHz, a phase rotation amount is no more than 5 degrees, which is much smaller in comparison to the case of gain=1. A stable oscillator section having a short startup time, without startup failure is provided.

(2) For example, a low-powered Op amp can be used, with a small gain bandwidth product of the Op amp 122 of about 1 MHz (that is, with a small circuit bias current). An angular velocity sensor of a low power consumption is implemented accordingly.

Figure 6:
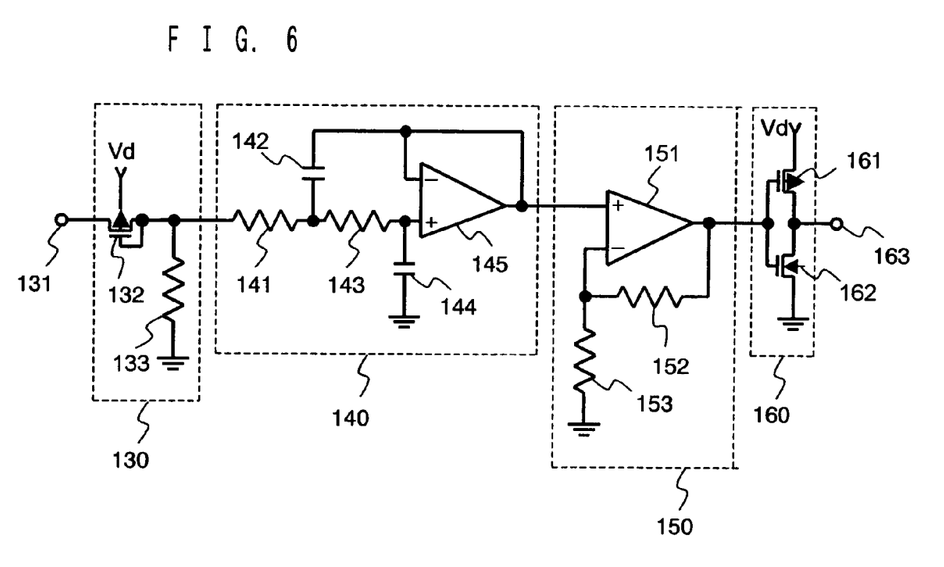
FIG. 6 is a drawing showing a configuration of the startup detection circuit of FIG. 2 according to the preferred embodiment 5 of the present invention.

Fifth Embodiment (FIG. 6)

A startup detection circuit shown in FIG. 6 is a circuit corresponding to the startup detection circuit 23 of FIG. 2.

The startup detection circuit has an input terminal 131 connected to the AGC circuit 32 of FIG. 2. A rectifier circuit 130, a low pass filter 140, an amplifier circuit 150, a wave-forming circuit 160, and an output terminal 163 are serially connected to the input terminal 131.

The rectifier circuit 130 has a PMOS 132 that connects a source electrode to the input terminal 131. Connecting a drain electrode and a gate electrode of the PMOS 132 comprises an equivalent rectifier circuit. The drain electrode and the gate electrode of the PMOS 132 are connected to the ground via a resistance 133, and connected to the low pass filter 140 of the next step. The low pass filter 140 is comprised of an active filter including resistances 141 and 143, capacitors 142 and 144, and an Op amp 145. On its output side, the amplifier circuit 150 is connected. The amplifier circuit 150 is comprised of an Op amp 151, and feedback resistances 152 and 153. On its output side, the wave-forming circuit 160 is connected. The wave-forming circuit 160 is comprised of an inverter circuit including a NMOS 162 and PMOS 161. On its output side, the output terminal 163 is connected. The output terminal 163 is connected to the input side of the gain switching circuit 24 of FIG. 2.

An operation of the startup detection circuit of FIG. 6 shall be described next.

If a startup of the angular velocity sensor of FIG. 2 finishes, an AC drive voltage Vout is input to the startup detection circuit of Embodiment 5. The AC drive voltage Vout input from the input terminal 131 is rectified at the equivalent rectifier circuit comprised of the PMOS 132 that connects the gate electrode and the drain electrode, and it is output to the negative charge resistance 133. This output voltage, after a DC component is extracted by the low pass filter 140 which is comprised of the active filter, is amplified up to a logic level at the amplifier circuit 150. An output voltage of the amplifier circuit 150 is logically converted at the wave-forming circuit 160, and a high level is output from the output terminal 163 if no input is made to the rectifier circuit 130, and a low level is output from the output terminal 163 if an input is made to the rectifier circuit 130. The gain switching circuit 24 of FIG. 2 is controlled by the high level or low level.

Embodiment 5 has the following effects as described next.

For example, when the startup detection circuit of Embodiment 5 is formed by using a semiconductor integrated circuit, a PN-junction diode of the rectifier circuit 130 and a large capacity capacitors 142 and 144 of the low pass filter 140 are unnecessary. Because of this, there's absolutely no attached component, and what is more, all devices may be configured to be operated at low voltage, for example, an integrated circuit operable at a power supply of 3 volts is provided. That is, since a diode having a pure PN-junction for use as a rectifier inside the intermediate potential of the circuit cannot be configured in a CMOS-type integrated circuit, so that the diode essentially becomes the attached component, which is not cost-effective. The component as built-in chip can provide a cost-effective application product.

It should be understood that embodiments 1 to 5 described above are given by way of illustration only, and the present invention should not be interpreted to be limiting to Embodiments 1 to 5, and various changes and modifications within the spirit and scope of the claims shall be implemented. The alternative examples, for example, are listed below (A) to (C).

(A) As the piezoelectric vibrator 11 of FIG. 2, the crystal tuning fork vibrator is described as example, however, other forms other than the tuning fork, such as trident-type, H-type and ring type can be utilized. As a vibrator material, other vibrator material besides the crystal can be utilized. Furthermore, the numbers and positioning of the drive electrodes 12a and 12b and the detection electrodes 13a and 13b may be changed appropriately.

(B) The circuit configuration of the oscillator section 20, the Coriolis output detection section 40 and the synchronous pulse forming section 60 of FIG. 2 can be simplified by not installing the compensation circuit or the amplifier circuits.

(C) The temperature compensation type amplifier circuits 22 and 45, the gain switching circuit 24, and the startup detection circuit 23 can be modified to other circuit configurations by using devices other than those illustrated. Further, each component of the configuration sections of FIG. 2 can be separated out, and they are applicable to other circuits and devices beside the angular velocity sensor.

The invention being thus described, it will be obvious that the same may be varied in many ways. Such variations are not to be regarded as a departure from the spirit and scope of the invention, and all such modifications as would be obvious to one skilled in the art are intended to be included with in the scope of the following claims.

What is claimed is:

1. An angular velocity sensor, comprising:
a piezoelectric vibrator having first and second drive electrodes, and first and second dejection electrodes, for outputting a drive current from the first drive electrode by exciting a vibration in a specific direction if an AC drive voltage is applied to the second drive electrode, and for outputting Coriolis output detection currents from the first and second detection electrodes if an angular velocity is applied from outside, by detecting an electric charge depending on the angular velocity by the first and second detection electrodes;

a temperature compensation function generating section for generating a temperature compensation function having an opposite temperature coefficient for compensating an oscillation characteristic and a detection characteristic of the piezoelectric vibrator;

a correction coefficient setting section for setting a correction coefficient for correcting a production unevenness of a device configuration;

an oscillator section for creating a temperature compensated voltage provided by converting the drive current to a voltage, and for supplying to the second drive electrode by creating the AC drive voltage from the temperature compensated voltage;

a synchronous pulse forming section for amplifying the temperature compensated voltage based on the correction coefficient and then performing a phase adjustment, and for creating and outputting a synchronous pulse for a synchronous detection; and a Coriolis output detection section for performing the synchronous detection of the Coriolis output detection currents based on the synchronous pulse, and for creating and outputting a DC detecting signal depending on the angular velocity;

wherein the oscillator section includes:

a first current/voltage converter circuit for converting the drive current to a voltage, and for outputting a conversion drive voltage;

a first temperature compensation circuit for creating and outputting the temperature compensated voltage by performing a temperature compensation of the conversion drive voltage based on the temperature compensation function;

a startup detection circuit for outputting a startup detecting signal, based on the AC drive voltage by detecting a startup state of the piezoelectric vibrator;

a gain switching circuit for switching a gain large at the startup of oscillation, and for switching a gain so that a loop gain of the oscillator section enters an appropriate range at a steady-state oscillation, to the temperature compensated voltage and based on the startup detecting signal;

a frequency bandwidth-limiting section for limiting a frequency bandwidth of an output voltage of the gain switching circuit, and for amplifying at an amplification degree that depends on the correction coefficient; and an automatic gain control section for calculating an error difference between an amplitude value of the AC drive voltage and a pre-determined amplitude value after finishing the startup of the piezoelectric vibrator, for controlling a gain of an output voltage of the frequency bandwidth-limiting section so that the error difference is zero, and for maintaining the amplitude value of the AC drive voltage constant;

and wherein the Coriolis output detection section includes:

a second current/voltage converter circuit for converting to a voltage the Coriolis output detection current output from the first detection electrode, and for outputting a first detection voltage;

a third current/voltage converter circuit for converting to a voltage the Coriolis output detection current output from the second detection electrode, and for outputting a second detection voltage;

a first voltage adjustment circuit for adjusting an amplitude and a phase of a common-mode component of the first detection voltage, based on the correction coefficient;
a second voltage adjustment circuit for adjusting an amplitude and a phase of a common-mode component of the second detection voltage, based on the correction coefficient;
a differential amplifier circuit for performing a differential amplification of output voltages of the first and second voltage adjustment circuits, for removing a common-mode component, and for extracting a Coriolis component which is a reversed-mode component;
a second temperature compensation circuit for limiting a frequency bandwidth of an output voltage of the differential amplifier circuit, and for performing a temperature compensation based on the temperature compensation function;
a detection section for detecting a direction and a magnitude of the Coriolis force, for limiting a frequency bandwidth by performing a synchronous detection of an output voltage of the second temperature compensation circuit based on the synchronous pulse, and for outputting a DC detection voltage by extracting a DC component;
an adjustment compensation circuit for performing a sensitivity setting of the DC detection voltage based on the correction coefficient, and for performing a temperature compensation of the sensitivity being set based on the temperature compensation function; and
an offset adjustment circuit for performing a zero point drift temperature compensation of an output voltage of the adjustment compensation circuit based on the temperature compensation function, and for outputting the DC detecting signal.

2. The angular velocity sensor according to claim 1,
wherein the first temperature compensation circuit is comprised of a first temperature compensation type amplifier circuit;
wherein the frequency bandwidth-limiting section includes a low pass filter for removing a high frequency component of the output voltage of the gain switching circuit; an amplifier circuit for amplifying an output voltage of the low pass filter by using the amplification degree that depends on the correction coefficient; and a high pass filter for removing a low frequency component of an output voltage of the amplifier circuit;
wherein the automatic gain control section includes a standard power supply circuit for outputting the pre-determined amplitude value as a standard; an amplitude information detection circuit for detecting and outputting an amplitude value of the AC drive voltage after finishing a startup of the piezoelectric vibrator; a comparator circuit for calculating the error difference by comparing the amplitude value of the AC drive voltage and the pre-determined amplitude value; a feedback circuit for returning the error difference; and an automatic gain control circuit for controlling a gain of an output voltage of the high pass filter based on the error difference of the feedback circuit, and for controlling so that an oscillation loop gain of the oscillator section is 1;
wherein the second temperature compensation circuit includes a high pass filter for removing a low frequency component of the output voltage of the differential amplifier circuit, and a second temperature compensation type amplifier circuit for performing the temperature compensation of an output voltage of the high pass filter based on the temperature compensation function;
wherein the detection section includes a synchronous detection circuit for detecting the direction and the magnitude of the Coriolis force by performing the synchronous detection of the output voltage of the second temperature compensation type amplifier circuit, based on the synchronous pulse; and a low pass filter for outputting the DC detection voltage by extracting the DC component of an output voltage of the synchronous detection circuit;
wherein the adjustment compensation circuit includes a full-scale adjustment circuit for performing the sensitivity setting of the DC detection voltage based on the correction coefficient; and a full-scale temperature compensation amplifier circuit for performing the temperature compensation of the sensitivity being set at the full-scale adjustment circuit, based on the temperature compensation function; and
wherein the offset adjustment circuit includes a DC offset adjustment circuit for performing the zero point drift temperature compensation of the output voltage of the full-scale temperature compensation amplifier circuit based on the temperature compensation function, and an output circuit for outputting the DC detecting signal by performing a buffer/amplify to an output voltage of the DC offset adjustment circuit.

3. The angular velocity sensor according to claim 2, wherein each of the temperature compensation type amplifier circuits comprise an operational amplifier, a MOS-type transistor which is gate controlled by the temperature compensation function, and which is connected to one side of a feedback resistance in the operational amplifier, and a resistance having a temperature coefficient of an opposite polarity from a temperature coefficient of an ON-resistance of the MOS-type transistor, which is connected to the MOS-type transistor.

4. The angular velocity sensor according to claim 2, wherein each of the temperature compensation type amplifier circuits serially connect Nth inverting amplifier circuits comprised of operational amplifiers (N=positive integer or no less than 2), and wherein one side of feedback resistance of each of the operational amplifiers are comprised of a resistive element of 1/N temperature coefficient of the temperature coefficient of the piezoelectric vibrator.

5. The angular velocity sensor according to claim 2, wherein the gain switching circuit includes an operational amplifier, a resistance for deciding a gain of the operational amplifier, and a switch element connected to the resistance for performing an ON/OFF operation by the startup detecting signal, wherein the switch element is ON by the startup detecting signal at the startup of the oscillator section, and a gain is set greater than 1 and no more than 3, and the switch element is OFF by the startup detecting signal if the piezoelectric vibrator starts oscillation, and a gain is set to 1.

6. The angular velocity sensor according to claim 2, wherein the startup detection circuit comprises a rectifier circuit including a P-channel MOS-type transistor connecting a gate electrode and a drain electrode, a low pass filter including an active filter, an amplifier circuit, and a waveforming circuit, which are serially connected.

* * * * *